(12) United States Patent
Peng et al.

(10) Patent No.: US 8,820,537 B2
(45) Date of Patent: Sep. 2, 2014

(54) JIG ASSEMBLY FOR ORIENTING, SORTING AND SELECTING FASTENER NUTS

(71) Applicant: Hon Hai Precision Industry Co., Ltd., New Taipei (TW)

(72) Inventors: Li-Dong Peng, Shenzhen (CN); Yu Zhao, Shenzhen (CN); Yang Zhang, Shenzhen (CN); Kai-Lai Yang, Shenzhen (CN); Jian-Ming Huang, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/693,277

(22) Filed: Dec. 4, 2012

(65) Prior Publication Data
US 2013/0146511 A1 Jun. 13, 2013

(30) Foreign Application Priority Data
Dec. 11, 2011 (CN) .......................... 2011 2 0517258

(51) Int. Cl.
*B07C 5/02* (2006.01)
(52) U.S. Cl.
USPC ............................ 209/541; 209/545; 209/660

(58) Field of Classification Search
USPC ......... 209/539, 541, 543, 545, 658–660, 910, 209/920; 193/44
See application file for complete search history.

(56) References Cited

U.S. PATENT DOCUMENTS

| 688,731 A | * | 12/1901 | Hinds | 221/68 |
| 3,997,058 A | * | 12/1976 | Greer et al. | 209/625 |
| 6,662,953 B1 | * | 12/2003 | Rouse | 209/682 |

* cited by examiner

*Primary Examiner* — Michael McCullough
(74) *Attorney, Agent, or Firm* — Novak Druce Connolly Bove + Quigg LLP (57) ABSTRACT

A jig assembly for selecting and presenting fastener nuts in the correct orientation, each fastener nut including a nut cap and an assembling portion formed on an end of the fastener nut. The diameter of the nut cap is larger than the diameter of the assembling portion. The jig assembly includes an electric cabinet, a jig bracket, a feed container, and a sorting tray. The feed container includes a selector with an opening. The width of the opening is equal to the height of the fastener nut, the first sidewall of the selector forms a plurality of restricting protrusions, and each two adjacent restricting protrusions cooperatively define a restricting groove therebetween. The width of each restricting groove is equal to the diameter of the assembling portion, thus only fastener nuts in the correct orientation are capable of passing through the selector to be collected in the sorting tray.

5 Claims, 8 Drawing Sheets

JIG ASSEMBLY FOR ORIENTING, SORTING AND SELECTING FASTENER NUTS

BACKGROUND

1. Technical Field

The present disclosure relates to jig assembly, particularly to a jig assembly for dispensing, selecting, and sorting fastener nuts in a certain specified orientation.

2. Description of Related Art

A fastener nut has a nut cap and an assembling portion formed on an end of the nut cap, and the diameter of the nut cap is larger than the diameter of the assembling portion. In use, the assembling portion of the fastener nut is used as a surface for welding or otherwise attaching to a component. Typically, a plurality of fastener nuts are loaded in a container in a disordered state, and the relatively small size of the fastener nuts makes the presentation of the fastener nuts in the correct orientation thereof for immediate attachment to another object a very inefficient process.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the jig assembly. Moreover, in the drawings, like reference numerals designate corresponding parts throughout the several views. Wherever possible, the same reference numerals are used throughout the drawings to refer to the same or like elements of an embodiment.

DETAILED DESCRIPTION

Figure 1:
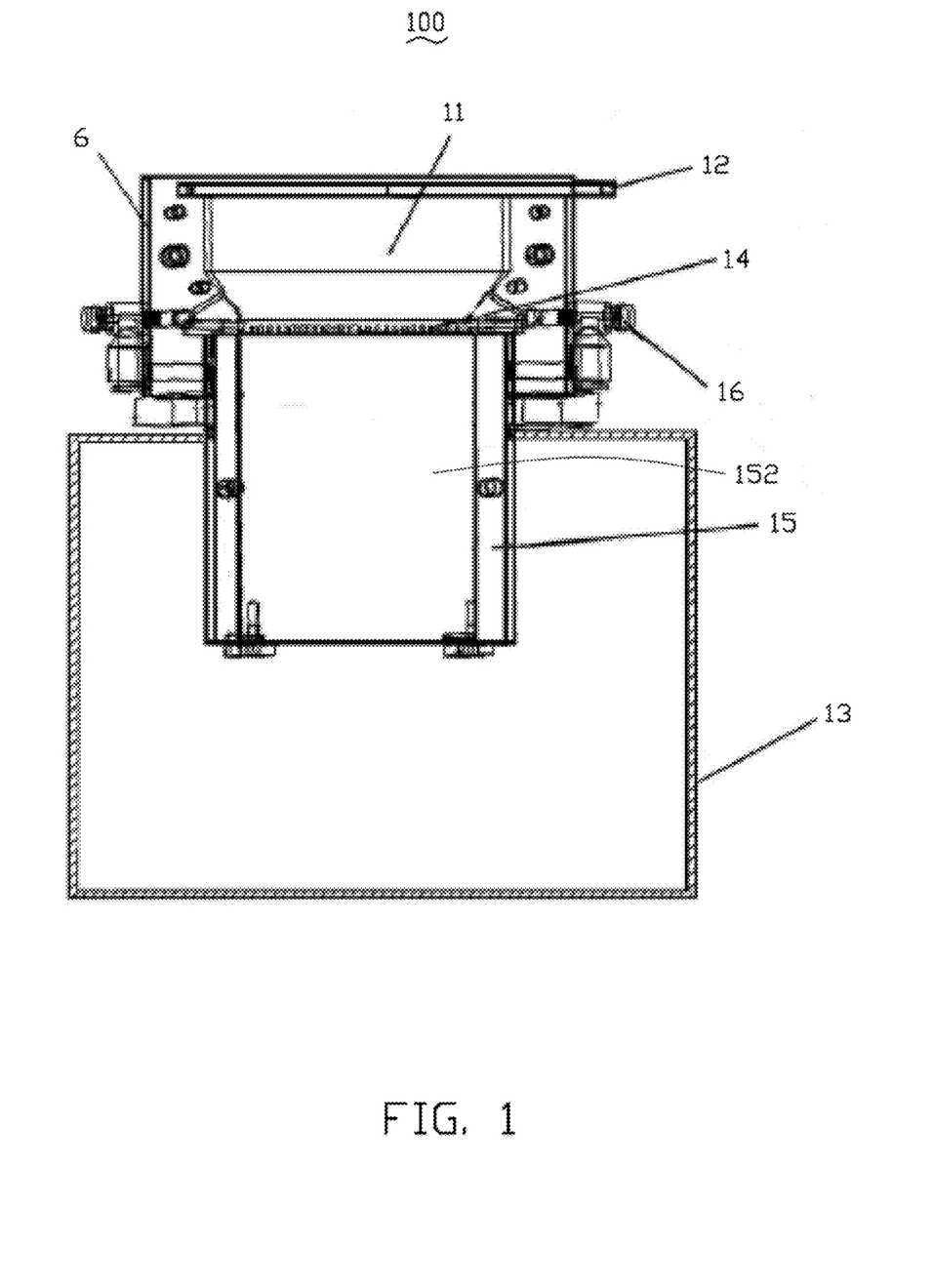
FIG. 1 is a cross-sectional view of an embodiment of a jig assembly for orienting, selecting, and sorting fastener nuts including a jig bracket and a feed container.
Figure 2:
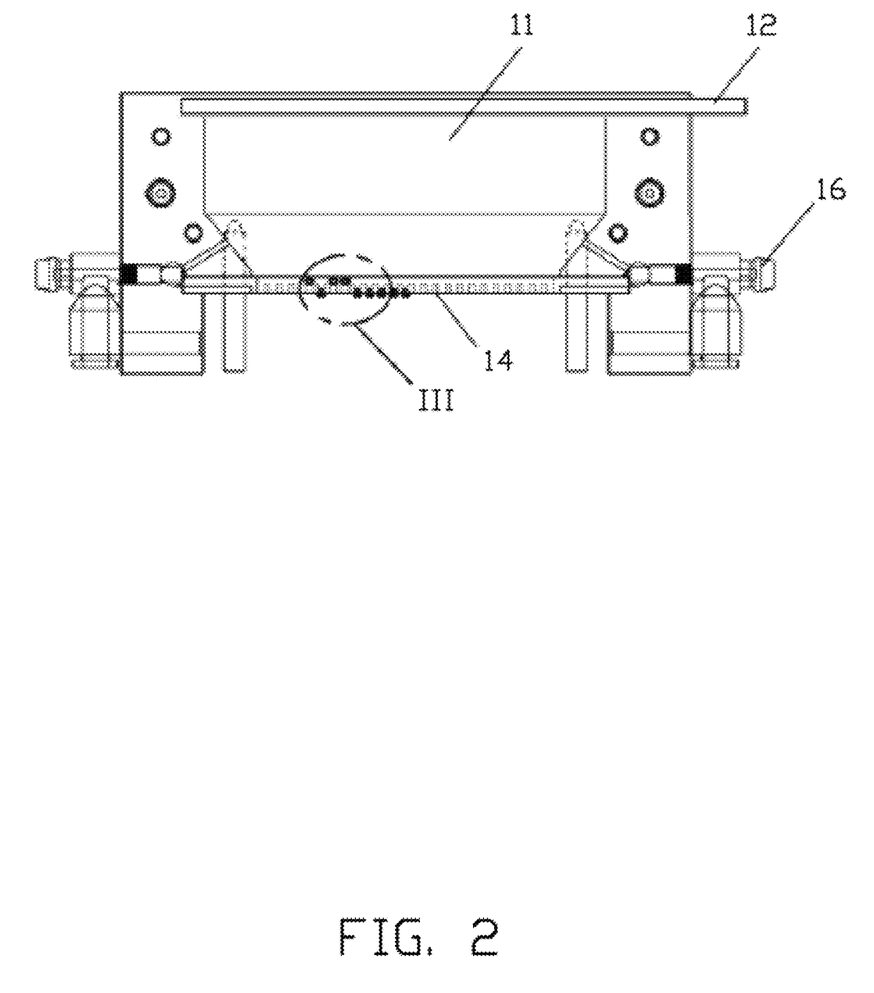
FIG. 2 is a cross-sectional view of the jig bracket with the feed container, of FIG. 1.
Figure 3:
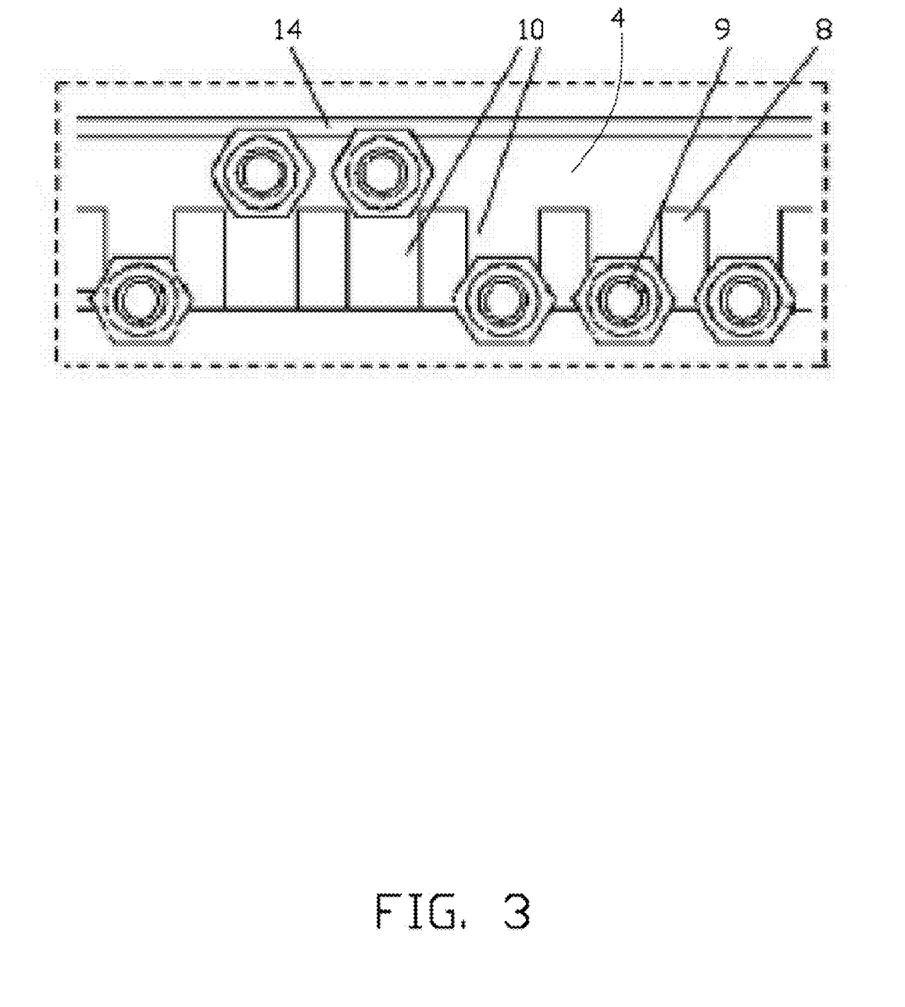
FIG. 3 is an enlarged view of a circled portion III of FIG. 2.
Figure 4:
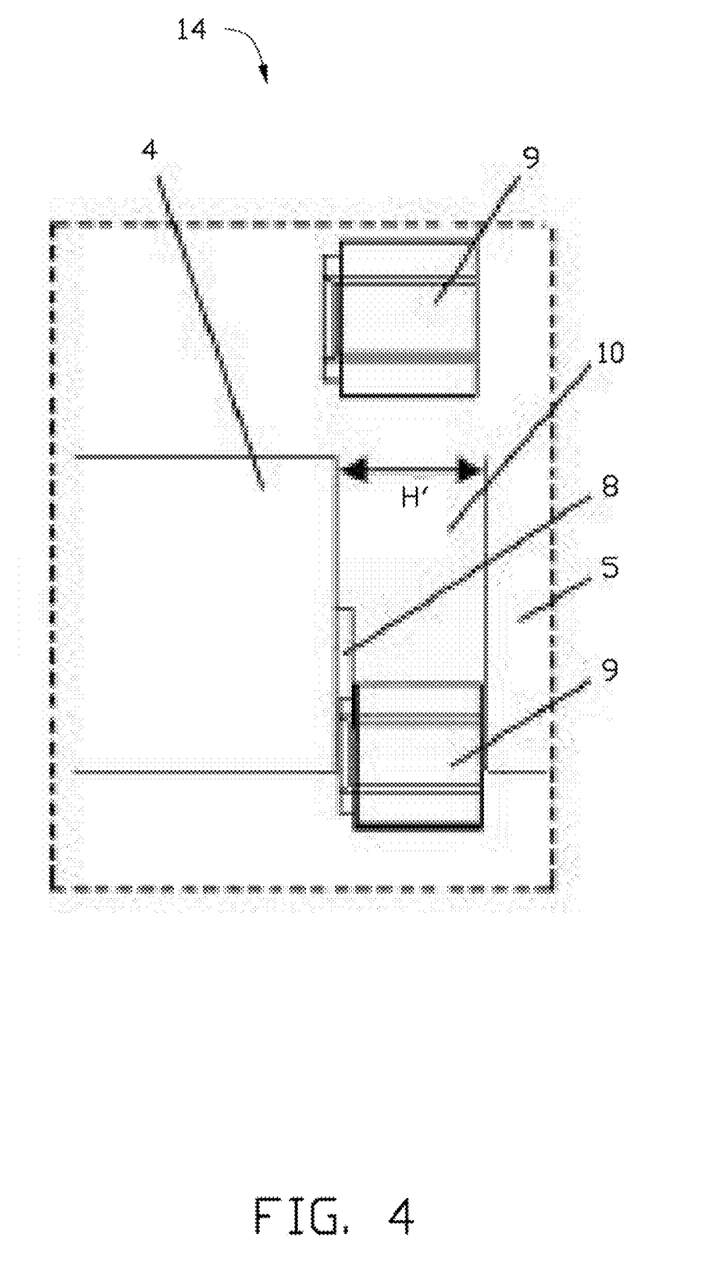
FIG. 4 is a side view of a part of the selector of the jig assembly of FIG. 3 showing a fastener nut being dropped.
Figure 5:
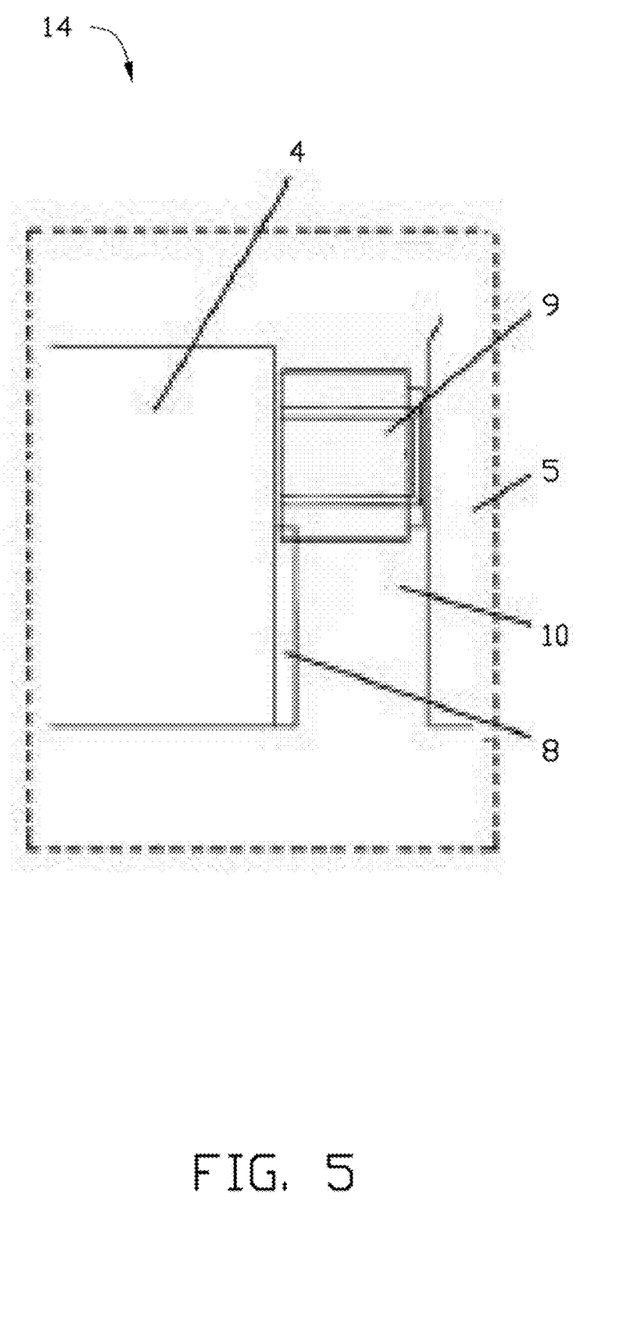
FIG. 5 is similar as FIG. 4, but showing the fastener nut in stationary state.

FIGS. 1-2 show an embodiment of a jig assembly 100 for automatically selecting, orienting and sorting a plurality of fastener nuts 9 (seen in FIG. 3). The jig assembly 100 includes an electric cabinet 13, a jig bracket 6, a feed container 11, and a sorting tray 15. The jig bracket 6 is loaded on a top of the electric cabinet 13. The feed container 11 is assembled on the jig bracket 6. The sorting tray 15 is detachably assembled on the jig bracket 6 located below the feed container 11.

Figure 6:
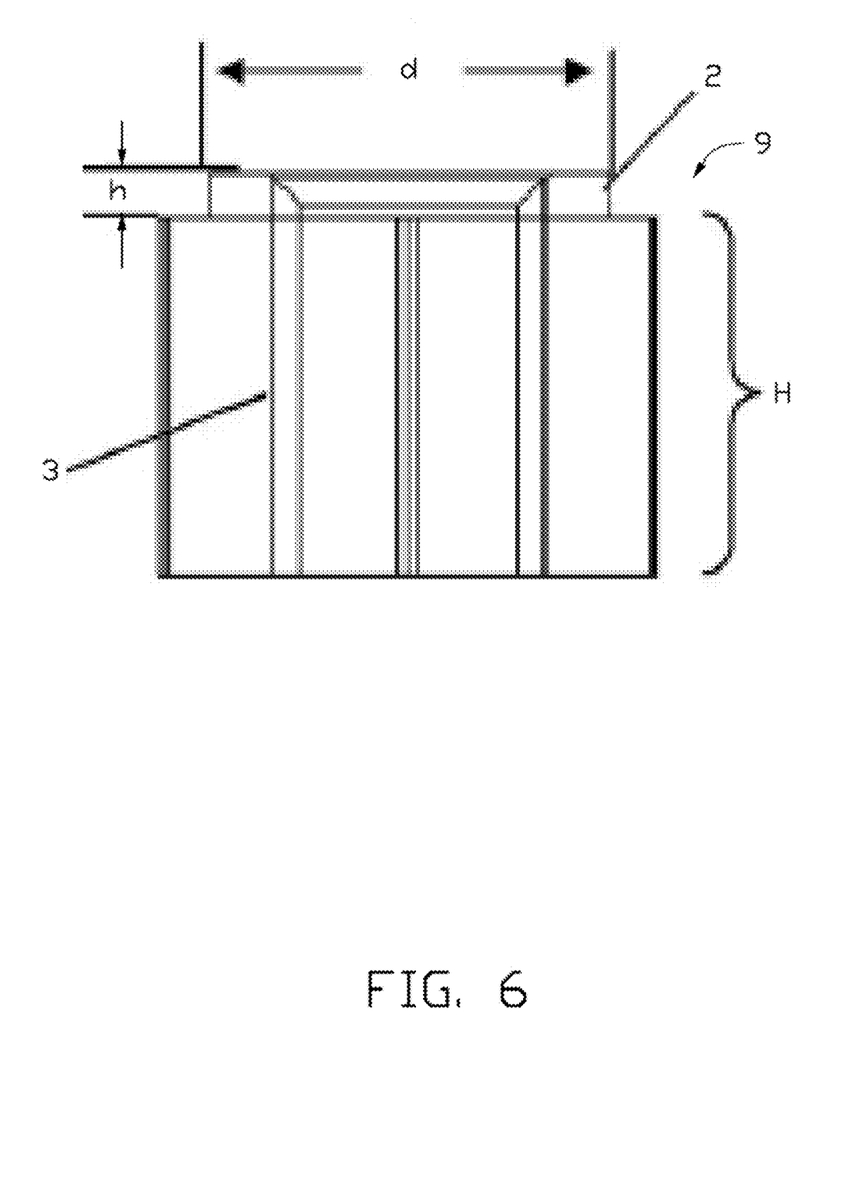
FIG. 6 is a cross-sectional view of an embodiment of a fastener nut.
Figure 7:
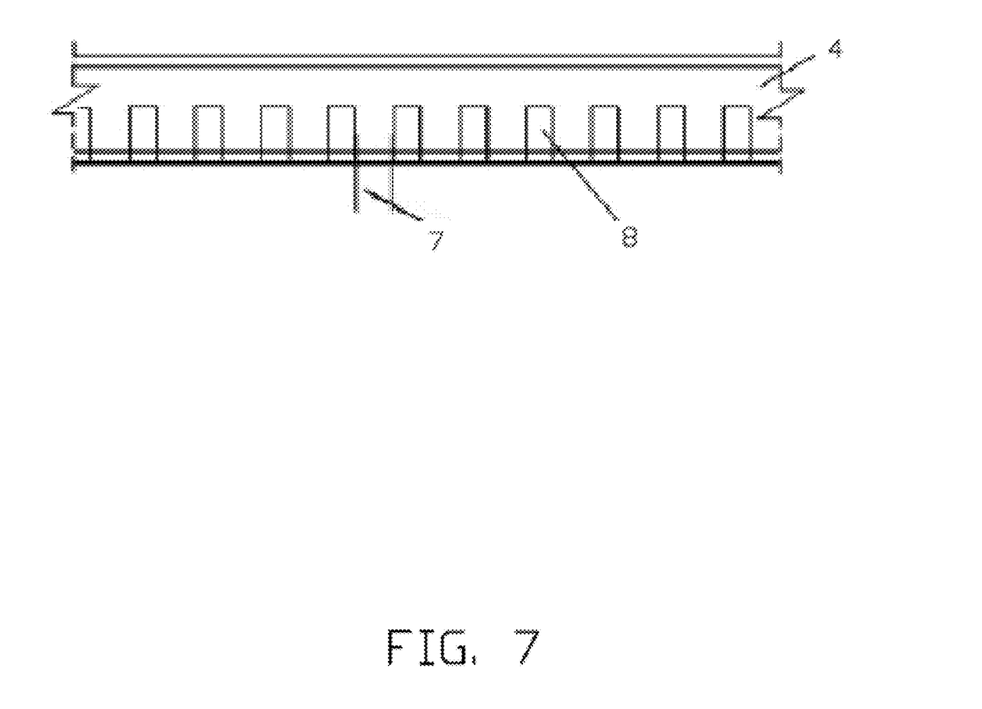
FIG. 7 is a top plan view of the opening of the selector of the jig assembly of FIG. 1.
Figure 8:
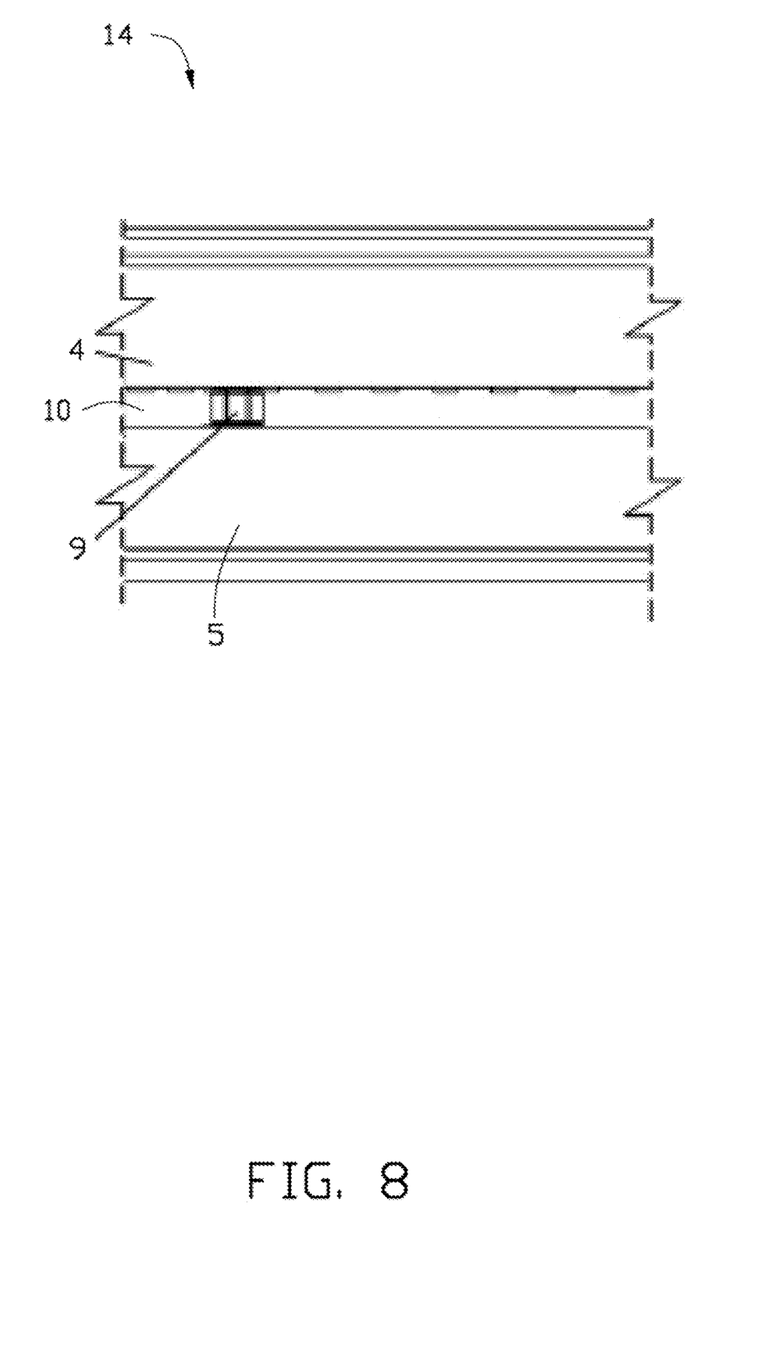
FIG. 8 is a front view of the opening of the selector of the jig assembly of FIG. 1.

FIG. 6 shows an embodiment of one fastener nut 9 which includes a nut cap 3 and an assembling portion 2 formed on an end of the nut cap 3. In the illustrated embodiment, the diameter of the assembling portion 2 is designated as d, and the diameter of the nut cap 3 is larger than the diameter of the assembling portion 2. The height of the nut cap 3 is designated as H, and the height of the assembling portion 2 is designated as h.

The feed container 11 is substantially a funnel, and defines an opening at the larger end thereof. In the illustrated embodiment, the feed container 11 contains and stores the fastener nuts 9 in a disordered state of various spatial orientations. The feed container 11 includes a selector 14 located in the bottom of the feed container 11 away from the opening thereof for withdrawing and selecting the fastener nuts 9 contained in the feed container 11.

FIGS. 3-5, and 7-8 show an embodiment of the selector 14. The selector 14 includes a first sidewall 4 and a second sidewall 5 (seen in FIG. 4) opposite to the first sidewall 4. The selector 14 defines an opening 10 in an end thereof adjacent to the sorting tray 15. In the illustrated embodiment, the opening 10 is formed between the first sidewall 4 and the second sidewall 5, and the width of the opening 10 is H', where H' is equal to the height of the fastener nut 9. The height of the fastener nut 9 is equal to the height of the nut cap 3 and the height of the assembling portion 2 combined together. Referring to FIG. 3 again, the first sidewall 4 forms a plurality of restricting protrusions 8 protruding out from the inner surface of the first sidewall 4. Every two adjacent restricting protrusions 8 cooperatively define a restricting groove 7 therebetween. The width of the restricting groove 7 is equal to the diameter d of the assembling portion 2, and the thickness of each restricting protrusion 8 is equal to the height h of the assembling portion 2. In an alternative embodiment, the thickness of each restricting protrusion 8 can be less than the height h of the assembling portion 2.

Referring to FIG. 2 again, the jig assembly 100 further includes a cover 12 fitted on the opening of the feed container 11, to create substantially an airtight seal at the top of the feed container 11, and two compressed air valves 16 are fastened to opposite sides of the feed container 11. The feed container 11 communicates with a compressed air source (not shown) via the two compressed air valves 16.

The sorting tray 15 is a rectangular board, and defines a receiving space 152 (seen in FIG. 1) communicating with the opening 10 of the selector 14, for receiving the fastener nuts 9 selected by the selector 14. The width of the receiving space 152 is equal to the height H of the fastener nut 9. In the illustrated embodiment, the sorting tray 15 includes a back wall (not shown), a front wall (not shown) parallel to the back wall, and a plurality of sidewalls connected to the back wall and the front wall thereof. The back wall, the front wall, and the plurality of sidewalls cooperatively define the receiving space 152, and the distance between the back wall and the front wall of the sorting tray 15 is equal to the height H of the fastener nut 9.

In use, the plurality of nuts 9 are loaded in the feed container 11, the two compressed air valves 16 are turned on alternately, any nuts 9 with the assembling portion 2 which is adjacent to the first sidewall 4 will pass through one restricting groove 7 and be pushed into the receiving space 152 of the sorting tray 15 because of the exerted force from the pressure of the compressed air. On the other hand, any fastener nuts 9 with the nut cap 3 which is adjacent to the first sidewall 4 will not pass through the restricting groove 7 and will remain kept in the feed container 11, and upon the agitation provided by the periodic air flow from the air source through the compressed air valves 16, the respective fastener nut 9 will eventually have the spatial orientation thereof arranged with the assembling portion 2 to be adjacent to the first sidewall 4. It is likely that 50% of all attempts for trying to pass through the restricting grooves 7 by the fastener nuts 9 will be successfully passed through into and to be collected in the sorting tray 15 when the two compressed air valves 16 are turned on at intermittent intervals due to statistical probability. Therefore, this is a very convenient and efficient way to correctly select the fastener nuts 9 which are in the correct orientation.

The width of the opening 10 of the selector 14 can be changed according to the different heights of different fastener nuts 9 for sorting, and the width of the restricting groove 7 can be changed according to the different diameters of the assembling portions 2 of the different fastener nuts 9. Accordingly, the jig assembly 100 can be adapted to select and orient different types of fastener nuts 9, so as to be arranged and configured to the correct presentation or spatial orientation of the fastener nuts 9 for later attachment or other next process.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A jig assembly for selecting, orienting and sorting a plurality of fastener nuts in a correct orientation of the fastener nuts, each fastener nut comprising a nut cap and an assembling portion formed on an end of the nut cap, the jig assembly comprising:
   an electric cabinet;
   a jig bracket loaded on a top of the electric cabinet;
   a feed container comprising a selector assembled on the jig bracket; and
   a sorting tray detachably assembled on the jig bracket below the feed container, wherein the diameter of the nut cap of the fastener nut is larger than the diameter of the assembling portion, the selector comprises a first sidewall and a second sidewall opposite to the first sidewall, and defines an opening between the first sidewall and the second sidewall in an end of the selector adjacent to the sorting tray, the width of the opening of the selector is equal to the height of the fastener nut, the first sidewall forms a plurality of restricting protrusions protruding out from the inner surface of the first sidewall, every two adjacent restricting protrusions cooperatively define a restricting groove therebetween, the width of each restricting groove is equal to the diameter of the assembling portion, and the restricting groove is configured for the assembling portion of the fastener nut passing therethrough, the space between the second sidewall and each of the restricting protrusions is configured for the nut cap passing therethrough, and the thickness of each restricting protrusion is less than or equal to the height of the assembling portion, thus only the fastener nuts in the correct orientation are capable of passing through the selector to be collected in the sorting tray.

2. The jig assembly of claim 1, wherein the feed container is a funnel, and the selector is located in the bottom of the feed container.

3. The jig assembly of claim 2, further comprising a cover covering an end of the feed container away from the selector.

4. The jig assembly of claim 1, further comprising two compressed air valves fastened to opposite sides of the feed container.

5. The jig assembly of claim 1, wherein the sorting tray defines a receiving space communicated with the opening of the selector for receiving the fastener nuts selected by the selector, and the width of the receiving space is equal to the height of the fastener nut.

* * * * *